(12) United States Patent
Liao et al.

(10) Patent No.: US 11,203,190 B2
(45) Date of Patent: Dec. 21, 2021

(54) BREATHABLE FILM AND METHOD FOR MANUFACTURING SAME

(71) Applicant: 4C Air, Inc., Sunnyvale, CA (US)

(72) Inventors: Lei Liao, San Jose, CA (US); Mervin Zhao, Sunnyvale, CA (US); Qiqi Wang, Sunnyvale, CA (US); Wang Xiao, Santa Clara, CA (US); Haotian Wang, San Jose, CA (US)

(73) Assignee: 4C Air, Inc., Sunnyvale, CA (US)

( * ) Notice: Subject to any disclaimer, the term of this patent is extended or adjusted under 35 U.S.C. 154(b) by 84 days.

(21) Appl. No.: 16/718,119

(22) Filed: Dec. 17, 2019

(65) Prior Publication Data

US 2021/0178737 A1     Jun. 17, 2021

(51) Int. Cl.
*B32B 27/12*     (2006.01)
*B32B 27/32*     (2006.01)
*B32B 7/12*      (2006.01)

(52) U.S. Cl.
CPC ............... *B32B 27/12* (2013.01); *B32B 7/12* (2013.01); *B32B 27/32* (2013.01); *B32B 2307/72* (2013.01); *B32B 2307/724* (2013.01); *B32B 2307/732* (2013.01); *B32B 2327/12* (2013.01)

(58) Field of Classification Search
CPC ... B32B 27/12; B32B 2307/724; B32B 27/32; B32B 7/12; B32B 2307/732; B32B 2307/72; B32B 2307/12
See application file for complete search history.

(56) References Cited

U.S. PATENT DOCUMENTS

| | | | | |
|---|---|---|---|---|
| 6,010,776 A | * | 1/2000 | Exsted | C08J 9/28 428/305.5 |
| 6,887,807 B1 | * | 5/2005 | Matsushita | B32B 5/26 442/381 |
| 2017/0266919 A1 | * | 9/2017 | Seok | D06M 17/04 |
| 2019/0310155 A1 | * | 10/2019 | Seo | B32B 27/32 |

* cited by examiner

*Primary Examiner* — Michael C Miggins
(74) *Attorney, Agent, or Firm* — Sheppard Mullin Richter & Hampton LLP

(57) ABSTRACT

A breathable film includes a substrate, a membrane disposed on the substrate, and an adhesive interposed between the substrate and the membrane. The membrane includes a plurality of fibers of polyvinylidene fluoride. The breathable film has an air transmission rate equal to or greater than 4000 ml/min/cm$^2$ under air pressure of 70 mbar.

20 Claims, 7 Drawing Sheets

BREATHABLE FILM AND METHOD FOR MANUFACTURING SAME

BACKGROUND

The ubiquitous electronic devices have been equipped with various special functions. For example, advanced cell phones and wearable devices are being marketed as being waterproof to a certain degree. Those devices generally provide a specification of being waterproof up to 1-1.5 meters for about 30 minutes. To be waterproof, electronic devices generally include a waterproof, airflow-permeable thin film to wrap electronic components in the electronic devices. The waterproof, airflow permeable thin film allows the air to pass through to cool the electronic components that, when working, generate heat. Further, the thin film needs to prevent water from entering the interior of the electronic devices as water would damage the electronic components therein.

SUMMARY

Described herein are breathable films for electronic devices and methods for manufacturing the breathable films.

In one aspect, the disclosure describes a breathable film. The breathable film includes a substrate, a membrane disposed on the substrate, and an adhesive interposed between the substrate and the membrane. The membrane includes a plurality of fibers including polyvinylidene having carbon atoms partially fluorinated. The breathable film has an air transmission rate equal to or greater than 4000 ml/min/cm$^2$ under air pressure of 70 mbar.

In some embodiments, the breathable film further includes an adhesive layer disposed on a portion of the membrane. In some embodiments, the breathable film has an air transmission rate equal to or greater than 5000 ml/min/cm$^2$ under air pressure of 70 mbar. In one embodiment, the breathable film has an air transmission rate equal to or greater than 7000 ml/min/cm$^2$ under air pressure of 70 mbar.

In some embodiments, the breathable film has a water resistance greater than 1 mH$_2$O. In some embodiments, the substrate includes one or more of nylon, polyethylene terephthalate, or polypropylene. In some embodiments, the substrate includes a non-woven thin film or a mesh film. In some embodiments, the substrate has a pore density of 1000-10000 pores/in$^2$.

In some embodiments, the membrane has a thickness of 10-300 μm. In some embodiments, the membrane is prepared by an electrospinning method. In some embodiments, the membrane has an air transmission rate equal to or greater than 5000 l/min/cm$^2$ under air pressure of 70 mbar. In some embodiments, the membrane has an air transmission rate equal to or greater than 7000 l/min/cm$^2$ under air pressure of 70 mbar.

In some embodiments, the fibers in the membrane have a diameter of 100-3000 nm.

In another aspect, the disclosure describes a method for manufacturing a breathable film. The method includes providing a substrate, coating an adhesive on the substrate, electrospinning a membrane on the adhesive layer, and thermal pressing the breathable film at a temperature of 80-200° C.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION OF EMBODIMENTS

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances.

Furthermore, the particular features, structures, or characteristics may be combined in any suitable manner in one or more embodiments.

Various embodiments described herein are directed to breathable films for electronic devices and methods for manufacturing the breathable films.

Figure 1:
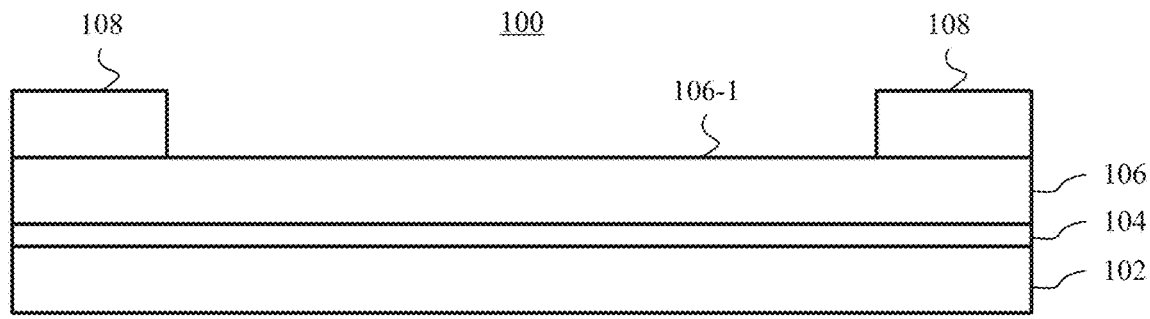
FIG. 1 is a schematic diagram illustrating a breathable film, according to one example embodiment.

Embodiments will now be explained with accompanying figures. Reference is first made to FIG. 1. FIG. 1 is a schematic diagram illustrating a breathable film 100, according to one example embodiment. The breathable film 100 includes a substrate 102, an adhesive 104, a membrane 106, and an adhesive layer 108. The adhesive 104 is disposed between the substrate 102 and the membrane 106. The adhesive layer 108 is disposed on a portion of the membrane 106, exposing a surface 106-1 of the membrane 106. In some embodiments, the portion of the membrane 106 that is covered by the adhesive layer 108 is less than 80% of the total top surface of the membrane 106. In some embodiments, to provide better breathability, the portion of the membrane 106 covered by the adhesive layer 108 is less than 70%, 50%, or 30% of the total top surface of the membrane 106.

The breathable film 100 has an air transmission/flow rate equal to or greater than 4000 ml/min/cm$^2$ (milliliter per minute per centimeter square) under air pressure of 70 mbar. In some embodiments, the breathable film 100 has an air transmission rate, under air pressure of 70 mbar, equal to or greater than 5000 ml/min/cm$^2$, 5500 ml/min/cm$^2$, 6000 ml/min/cm$^2$, 6500 ml/min/cm$^2$, 7000 ml/min/cm$^2$, 7500 ml/min/cm$^2$, 8000 ml/min/cm$^2$, 8500 ml/min/cm$^2$, 9000 ml/min/cm$^2$, 9500 ml/min/cm$^2$, or 10000 ml/min/cm$^2$. In some embodiments, the breathable film has a water resistance (waterproof capacity) greater than 4 mH$_2$O. In some embodiments, the breathable film has a water resistance greater than 1 mH$_2$O, greater than 1.5 mH$_2$O, greater than 2 mH$_2$O, greater than 2.5 mH$_2$O, greater than 3 mH$_2$O, or greater than 3.5 mH$_2$O. In some embodiments, the breathable film has a water resistance of 1-10 mH$_2$O, 1-2 mH$_2$O, 2-3 mH$_2$O, 3-4 mH$_2$O, 4-5 mH$_2$O, 6-7 mH$_2$O, 7-8 mH$_2$O, or 8-10 mH$_2$O.

In some embodiments, the substrate 102 includes a polymer, such as nylon, PET (polyethylene terephthalate), or polypropylene. In some embodiments, the substrate 102 includes a non-woven thin film or a mesh film. For example, when the substrate 102 is a mesh film, the substrate 102 may have a pore density of 1000-10000 pores/in$^2$. In some embodiments, the pore density of the substrate 102 may be 4000-7000 pores/in$^2$. In some embodiments, the adhesive 104 or the adhesive layer 108 includes water-based glue or other suitable adhesives, such as silicone, acrylic-based glue.

The membrane 106 has a thickness of 10-300 μm. In some embodiments, the membrane 106 has a thickness of 10-250 μm, 10-200 μm, 10-150 μm, 10-100 μm, 10-90 μm, 10-80 μm, 10-70 μm, 10-60 μm, 10-50 μm, 10-40 μm, 10-30 μm, 50-300 μm, 50-250 μm, 50-200 μm, 50-150 μm, 100-300 μm, 100-250 μm, 100-200 μm, 150-300 μm, 150-250 μm, or 200-300 μm. In some embodiments, the fibers of the membrane 106 have a diameter of 100-3000 nm. In some embodiments, the fibers of the membrane 106 have a diameter of 100-400 nm, 100-700 nm, 400-700 nm, 500-1000 nm, 700-1000 nm, 100-2500 nm, 100-2000 nm, 100-1500 nm, 100-1000 nm, 400-3000 nm, 400-2500 nm, 400-2000 nm, 400-1500 nm, 400-1000 nm, 700-3000 nm, 700-2500 nm, 700-2000 nm, or 700-1500 nm. In some embodiments, the fibers of the membrane 106 may have an average diameter in a range from about 10 nm to about 100 μm, about 10 nm to about 1 μm, about 10 nm to about 500 nm, or about 30 nm to about 400 nm. In some embodiments, the fibers of the membrane 106 may have an average diameter in a range between and including any two of the following: about 30 nm, about 32 nm, about 34 nm, about 36 nm, about 38 nm, about 40 nm, about 42 nm, about 44 nm, about 46 nm, about 48 nm, about 50 nm, about 52 nm, about 54 nm, about 56 nm, about 58 nm, about 60 nm, about 62 nm, about 64 nm, about 66 nm, about 68 nm, about 70 nm, about 72 nm, about 74 nm, about 76 nm, about 78 nm, about 80 nm, about 82 nm, about 84 nm, about 86 nm, about 88 nm, about 90 nm, about 92 nm, about 94 nm, about 96 nm, about 98 nm, about 100 nm, about 110 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, about 260 nm, about 270 nm, about 280 nm, about 290 nm, about 300 nm, about 310 nm, about 320 nm, about 330 nm, about 340 nm, about 350 nm, about 360 nm, about 370 nm, about 380 nm, about 390 nm, and about 400 nm.

In some embodiments, the membrane 106 comprises a plurality of fibers comprising one or more polymers, such as polyvinylidene having carbon atoms partially fluorinated. In one example, a polyvinylidene having carbon atoms partially fluorinated may include polyvinylidene fluoride (PVDF). In some embodiments, the fibers of the membrane 106 may include one or more of polyvinylidene having carbon atoms partially fluorinated, PVDF, polypropylene, polyethylene, poly(ethylene oxide), polyethylene terephthalate, nylon, polyvinyl alcohol, polyvinylpyrrolidone, polystyrene, polyacrylonitrile, polyimide, polyvinyl chloride, polycarbonate, polyurethane, polysulfone, polyactic acid, polytetrafluoroethylene, polybenzoxazoles, poly-aramid, poly(phenylene sulfide), poly-phenylene terephthalamide, and combinations thereof.

In some embodiments, the membrane 106 may be prepared by an electrospinning method, which will be further explained hereinafter. The membrane 106 may be an electrical functional membrane that is waterproof and airflow permeable for protecting electronic components. In some embodiments, the membrane 106 has an air transmission rate equal to or greater than 5000 l/min/cm$^2$ (liter per minute per centimeter square) under air pressure of 70 mbar. In some embodiments, the membrane 106 has an air transmission rate, under air pressure of 70 mbar, equal to or greater than 7000 l/min/cm$^2$, equal to or greater than 10,000 l/min/cm$^2$, or between any two numbers of the above.

Figure 2A:
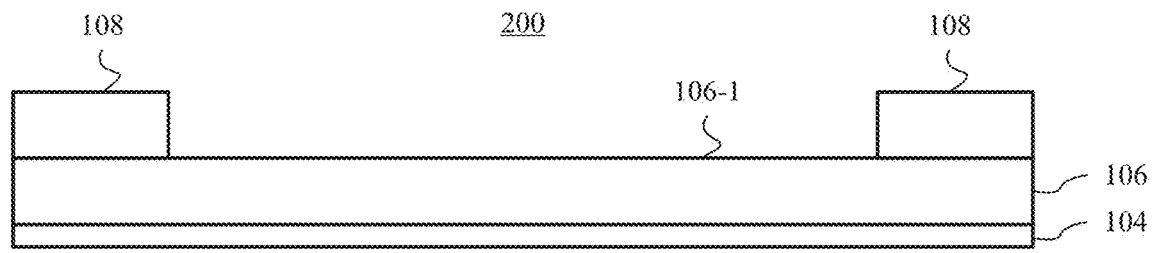
FIG. 2A is a schematic diagram illustrating another breathable film, according to one example embodiment.

FIG. 2A is a schematic diagram illustrating a breathable film 200, according to one example embodiment. The breathable film 200 includes an adhesive 104, a membrane 106, and an adhesive layer 108. The adhesive layer 108 is disposed on a portion of the membrane 106, exposing a surface 106-1 of the membrane 106. For example, the breathable film 200 may be formed by removing the substrate 102 from the breathable film 100 of FIG. 1.

Figure 2B:
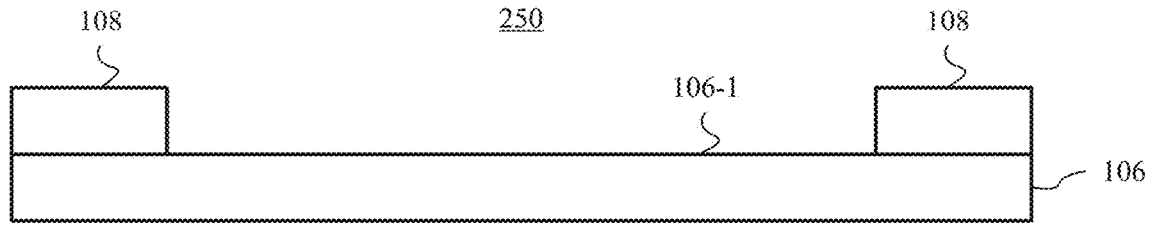
FIG. 2B is a schematic diagram illustrating another breathable film, according to one example embodiment.

FIG. 2B is a schematic diagram illustrating a breathable film 250, according to one example embodiment. The breathable film 250 includes a membrane 106 and an adhesive layer 108. The adhesive layer 108 is disposed on a portion of the membrane 106, exposing a surface 106-1 of the membrane 106. For example, the breathable film 250 may be formed by removing the adhesive 104 from the breathable film 200 of FIG. 2A.

Figure 3A:
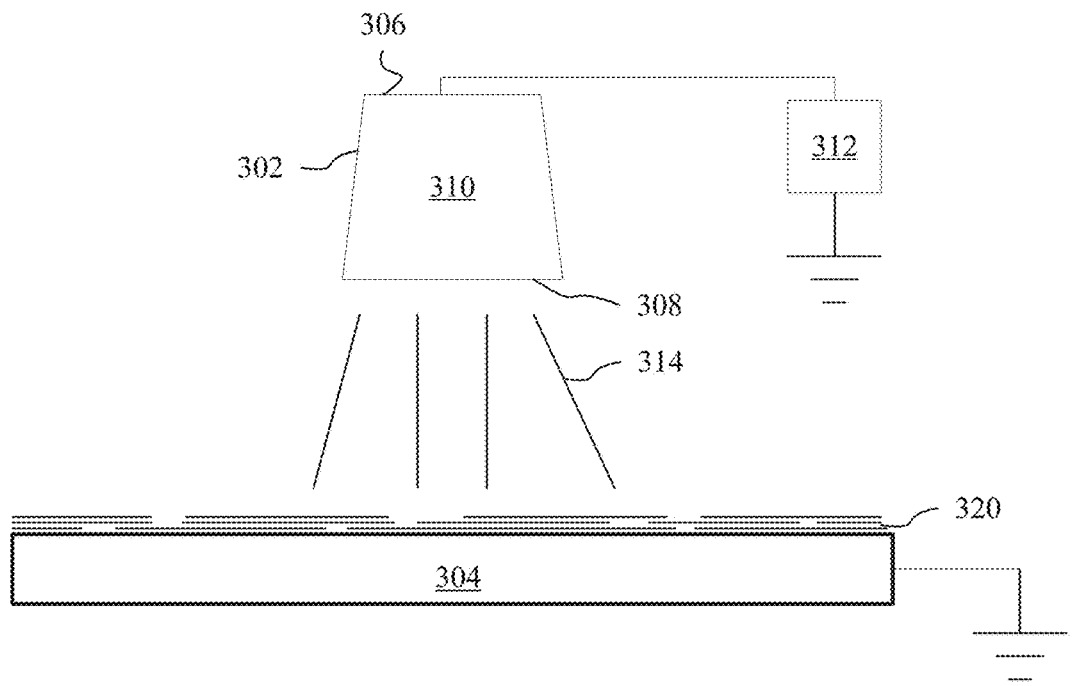
FIG. 3A is a schematic diagram illustrating an electrospinning method to form a membrane for a breathable film, according to one example embodiment.
Figure 3B:
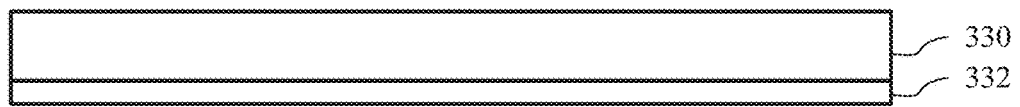
FIGS. 3B-3C are a schematic diagrams illustrating a membrane transfer process according to one example embodiment.
Figure 3B:
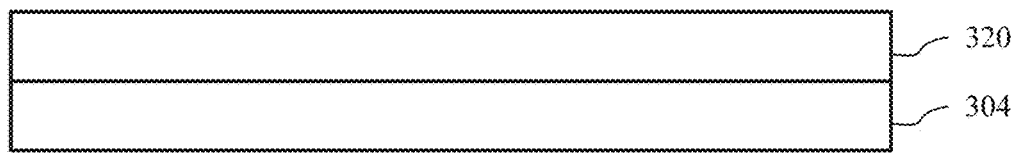
Figure 3C:
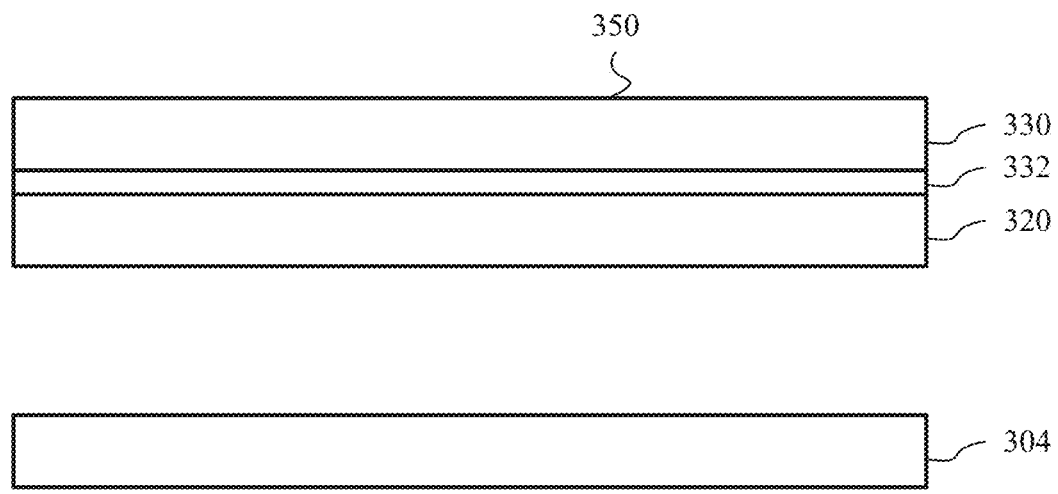

Methods for forming a breathable film are further explained herein. Reference is made to FIGS. 3A-3C. FIG. 3A is a schematic diagram illustrating an electrospinning method to form a membrane for a breathable film, according to one example embodiment. To perform an electrospinning method to form a membrane, at least one extrusion element 302 is provided. An extrusion element 302 may be referred to a component configured to extrude a material to be formed into a fiber. In some embodiments, the material to be formed into a fiber exits, or is drawn from, the extrusion element 302 toward a substrate 304. In some embodiments, the substrate 304 may be conductive, such as a metal plate. In some embodiments, the substrate 304 may be non-conductive plate placed on a conductive substrate holder.

The extrusion element 302 may comprise a first surface 306 in fluid communication with a first source of material (e.g., a polymer solution or polymer melt) to be formed into fiber, and a second, opposing surface 308 from which the material is extruded. In some embodiments, the extrusion element 302 may also include at least one chamber or outlet 310 extending between the first surface 306 and the second surface 308, through which the material to be formed into a fiber may pass.

A power source 312 may be operatively coupled to the extrusion element 302 and configured to supply a voltage thereto. When a sufficiently high voltage is applied to a liquid droplet formed near the second surface 308 of the extrusion element 302, the body of the liquid becomes charged. Electrostatic repulsion counteracts the surface tension such that the droplet is stretched, and, at a critical point, a stream of liquid 314 erupts from the second surface 308. In some embodiments, the second surface 308 may include one or more nozzles to form the droplet(s) or liquid stream(s). In some embodiments, multiple extrusion elements 302 may be employed for the electrospinning method, and each of the second surfaces 308 of the extrusion elements 302 may include one or more nozzles.

In some embodiments, the molecular cohesion of the liquid is sufficiently high, stream breakup does not occur (if stream breakup does occur, droplets are electrosprayed) and a charged liquid jet is formed. As the jet dries in flight, the mode of current flow changes from ohmic to convective as the charge migrates to the surface of the fiber 314. The jet is then elongated by a whipping process caused by electrostatic repulsion initiated at small bends in the fiber 314, until it is finally deposited on the substrate 304, which is connected to ground. In some embodiments, the elongation and thinning of the fiber 314 resulting from this bending instability leads to the formation of uniform fibers with nanometer-scale diameters. The fibers 314 accumulated on the substrate 304 to form a membrane 320.

FIG. 3B is a schematic diagram illustrating a membrane transfer process according to one example embodiment. After the electrospinning process shown in FIG. 3A, the membrane 320 containing the fibers 314 is formed on the substrate 304. A second substrate 330 is employed for the transfer process. The second substrate 330 may be a non-woven substrate or a mesh substrate and is coated with an adhesive 332. In some embodiments, a surface of the substrate 320 is rough. The second substrate 330 is then orientated such that the surface of the adhesive 332 can face the membrane 320. The substrate 304 and the second substrate 330 are then brought to close to each other so that the adhesive 332 is in contact with the membrane 320. After the membrane 320 is attached to the adhesive 332, the substrate 304 and the second substrate 330 are separated from each other as shown in FIG. 3C.

These operations generate a breathable film 350 comprising the second substrate 330, the adhesive 332, and the membrane 320. In some embodiments, an adhesive layer similar to the adhesive layer 108 in FIG. 1 may be applied to a portion of the membrane 320. In some embodiments, the breathable film 350 has water resistance of about 2 $mH_2O$ and good air permeability. For example, the breathable film 406 may an air transmission rate equal to or greater than 5000 $ml/min/cm^2$ under air pressure of 70 mbar.

Figure 4:
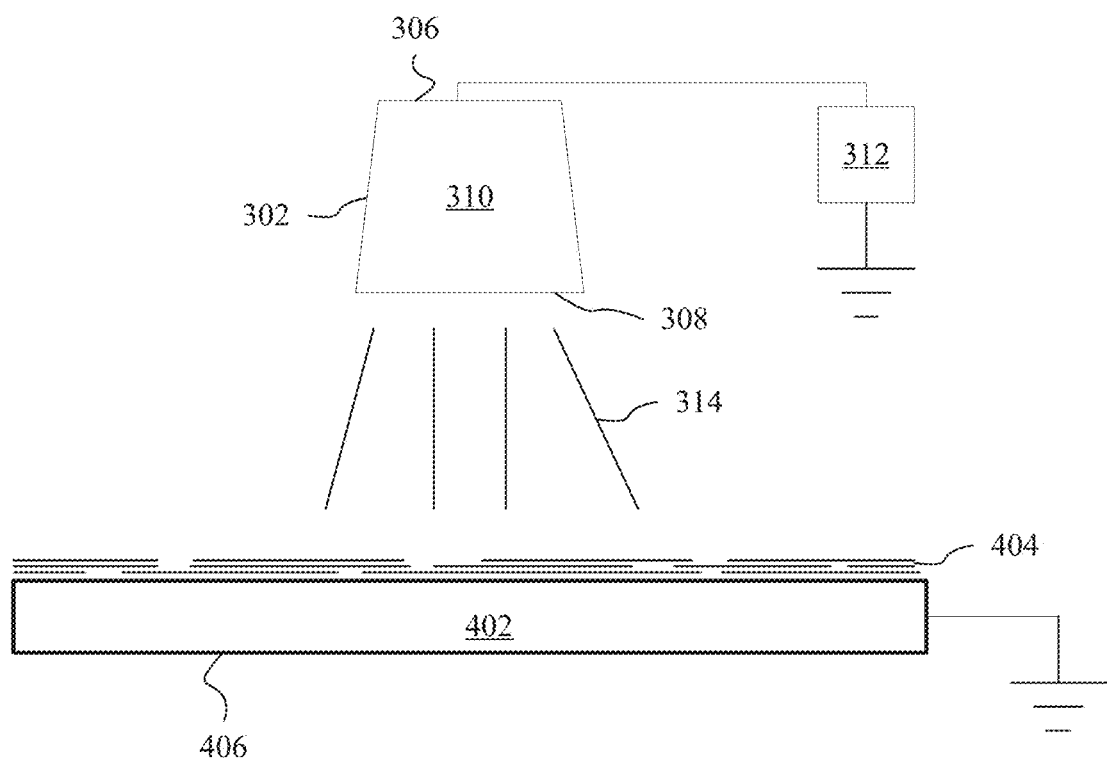
FIG. 4 is a schematic diagram illustrating a method for forming a breathable film, according to one example embodiment.

FIG. 4 is a schematic diagram illustrating a method for forming a breathable film, according to one example embodiment. Similar to FIG. 3A, at least one extrusion element 302 is provided to form a membrane. In some embodiments, a substrate 402 similar to the second substrate 330 of FIG. 3C is provided for the electrospinning process. For example, the substrate 402 may be a non-woven substrate or a mesh substrate and may include polypropylene. The extrusion element 302 generates fibers 314, which are deposited directly on the substrate 402. In some embodiments, the fibers 314 may be adhesive such that after the fibers 314 are deposited on the substrate 402, the fibers 314 may adhere to each other to form a membrane 404. These operations generate a breathable film 406 comprising the substrate 402 and the membrane 404. In some embodiments, an adhesive layer similar to the adhesive layer 108 in FIG. 1 may be applied to a portion of the membrane 404. In some embodiments, the breathable film 406 has water resistance of about 4 $mH_2O$ and good air permeability. For example, the breathable film 406 may an air transmission rate equal to or greater than 5000 $ml/min/cm^2$ under air pressure of 70 mbar.

Figure 5A:
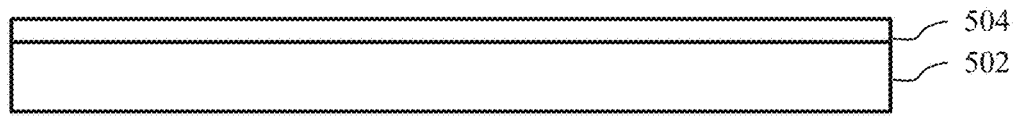
FIGS. 5A and 5B are schematic diagrams illustrating another method for forming a breathable film, according to one example embodiment.
Figure 5B:
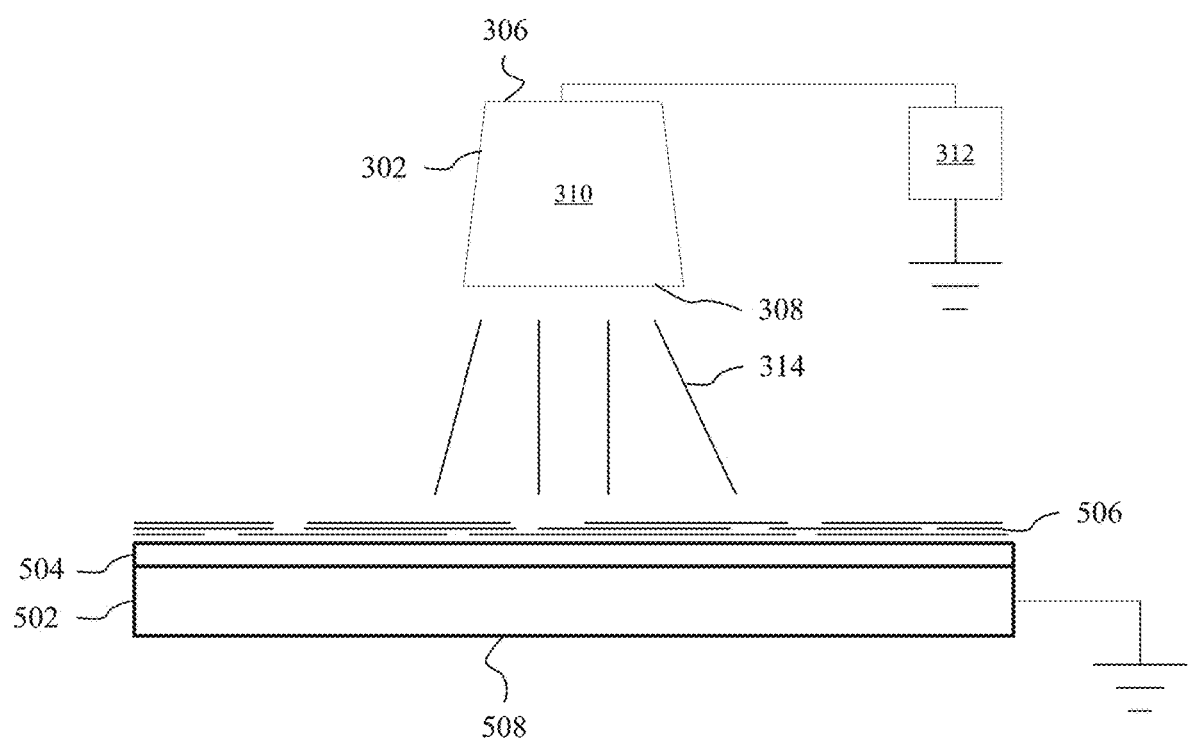

FIGS. 5A and 5B are schematic diagrams illustrating a method for forming a breathable film, according to one example embodiment. Referring to FIG. 5A, a substrate 502 is coated with an adhesive 504. For example, the substrate 502 may be a non-woven substrate or a mesh substrate and may include polypropylene. The adhesive 504 may be water based glue. The substrate 502 with the adhesive 504 is then placed under an extrusion element 302 (FIG. 5B). The extrusion element 302 generates fibers 314, which are deposited on the adhesive 504. In some embodiments, the fibers 314 may be adhesive such that after the fibers 314 are deposited on the adhesive 504, the fibers 314 may adhere to each other to form a membrane 506. These operations generate a breathable film 508 comprising the substrate 502, the adhesive 504, and the membrane 506. In some embodiments, an adhesive layer similar to the adhesive layer 108 in FIG. 1 may be applied to a portion of the membrane 506. In some embodiments, the breathable film 508 has water resistance of about 4 $mH_2O$ and good air permeability. For example, the breathable film 508 may an air transmission rate equal to or greater than 5000 $ml/min/cm^2$ under air pressure of 70 mbar. In some tests, the breathable film 508 are more robust than the breathable films 406 and 350 due to better lamination.

In some embodiments, one or more liquid-state polymers having a concentration of 1-30 wt % can be supplied to the chamber 310 through the first surface 306 with a feeding rate of 0.1-10 ml/hour/nozzle. The power source 312 then supplies a voltage of 10K-100K Volts to extrude fibers from the extrusion member 302. In some embodiments, a polymer for the electrospinning process may include PVDF, which forms a membrane that can have a water resistance of about 3 $mH_2O$. When polystyrene (PS) having a molecular weight of 80,000 g/mol is employed to form a membrane, the membrane can have a water resistance of about 0.5 $mH_2O$.

In some embodiments, the breathable film 350, 406, or 508 may be subject to one or more post-fabrication heat treatments to improve its performance and reliability. For example, the breathable film 350, 406, or 508 may be annealed at an elevated temperature of 80° C.-200° C., 100°

C.-170° C., 100° C.-150° C., 100° C.-140° C., 100° C.-130° C., 100° C.-120° C., 150° C.-160° C., or 160° C.-170° C. In some embodiments, the breathable film 350, 406, or 508 may be hot/thermal pressed at an elevated temperature of 80° C.-200° C., 100° C.-170° C., 100° C.-150° C., 100° C.-140° C., 100° C.-130° C., 100° C.-120° C., 150° C.-160° C., or 160° C.-170° C.

Figure 6:
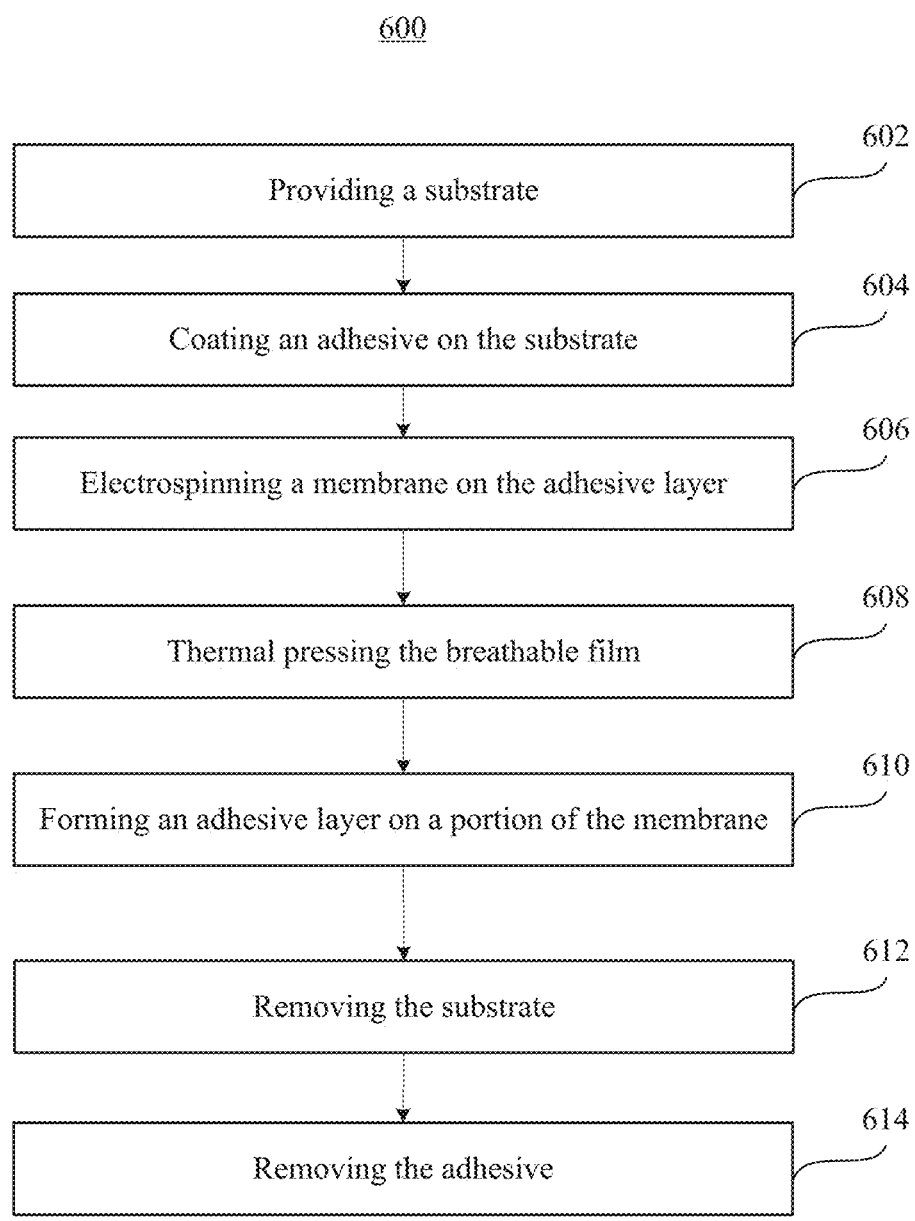
FIG. 6 is a flow chart illustrating a method for manufacturing a breathable film, according to one example embodiment.

FIG. 6 is a flow chart illustrating a method 600 for manufacturing a breathable film, according to one example embodiment. At 602, a substrate is provided or loaded for processing to form a breathable film. In some embodiments, the substrate is a non-woven or mesh substrate. The substrate may comprise one or more polymers. In one embodiment, the substrate comprises polypropylene. At 604, the substrate is coated with an adhesive. In some embodiments, the adhesive includes water-based glue. The adhesive may be coated with spin coating, slit coating, inject printing, or other suitable coating techniques. At 606, a membrane is deposited on the adhesive using an electrospinning technique. As described above, the electrospinning technique produces thin fibers from liquid polymer(s). The fibers are extruded from an extrusion member and deposited onto the substrate. The operations 602-606 generate a breathable film that is water resistant and air permeable. For example, the breathable film may have an air transmission rate equal to or greater than 4000 ml/min/cm$^2$ under air pressure of 70 mbar and a water resistance greater than 1.5 mH$_2$O.

In some embodiments, the method 600 may further include post-fabrication operations for the breathable film. For example, at 608, the breathable film may be thermal pressed to improve its reliability and reduce delamination. In some embodiments, alternatively or additionally, the breathable film may be subject to a thermal annealing process. At 610, an adhesive layer is formed on a portion of the membrane. The adhesive layer does not entirely cover the membrane and may, in some instances, covers less than 80% of a top surface of the membrane.

One of ordinary skill in the art should understand that one or more of the above operations of the method 600 may be omitted or modified. For example, the operation 604 may be omitted as described in connection with FIG. 4 such that the membrane may be formed directly on the substrate. That is, in 606 the membrane is deposited directly on the substrate using the electrospinning technique.

In some embodiments, after the membrane is formed on the substrate, at 612 the substrate may be removed to form a thin film comprising the adhesive layer, the membrane and the adhesive similar to the film structure shown in FIG. 2A. In a further embodiment, at 614 the adhesive may be removed from the thin film to generate a film structure similar to that illustrated in FIG. 2B.

Figure 7A:
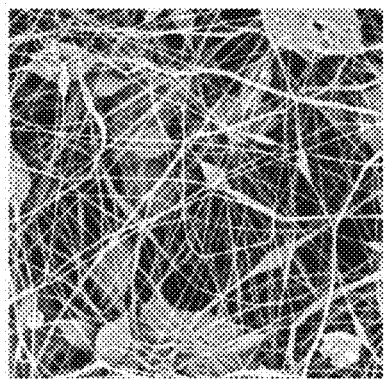
FIGS. 7A-7F are scanning electronic microscopy (SEM) photographs of membranes formed with electrospinning techniques, according to example embodiments.
Figure 7B:
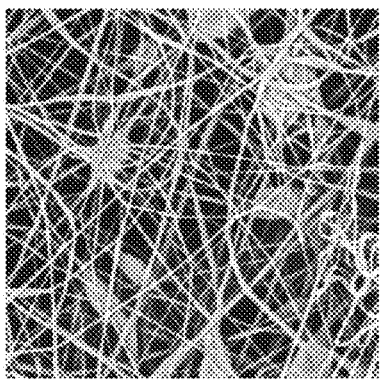
Figure 7C:
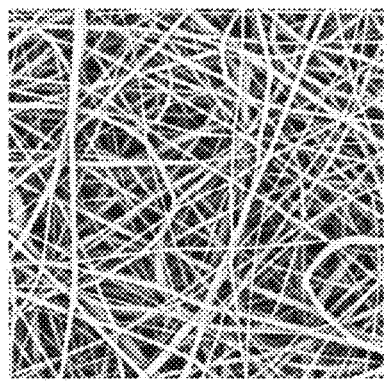
Figure 7D:
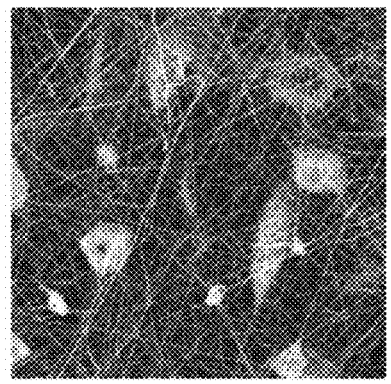
Figure 7E:
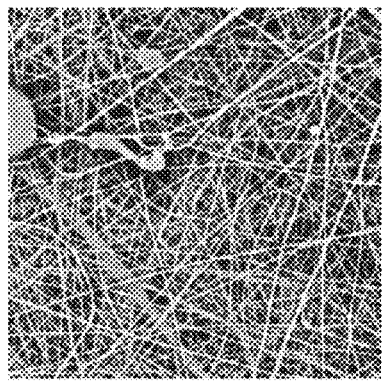
Figure 7F:
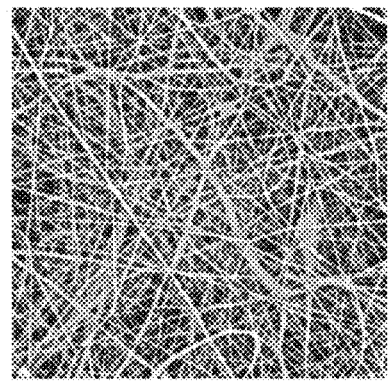

FIGS. 7A-7F are scanning electronic microscopy (SEM) photographs of membranes formed with electrospinning techniques, according to example embodiments. To change the diameter of the fibers deposited on a substrate, dimethylformamide (DMF) is added to the polymer for the membrane. The fiber diameter increases as a ratio (R) of the polymer content to the DMF content increases. This correlation is shown in FIGS. 7A-7C or in FIGS. 7D-7F. The membranes shown in FIGS. 7A-7C are formed from polymer solutions having a first level of cationic surfactant (CTAB) with various polymer-DMF ratios. The membranes shown in FIGS. 7D-7F are formed from polymer solutions having a second level of cationic surfactant (CTAB) with various polymer-DMF ratios. The increased polymer-DMF ratio leads to increased fiber diameter. As shown in FIGS. 7A-7C, the fiber diameter of the membrane in FIG. 7C is greater than that in FIG. 7B, which is greater than that in FIG. 7A. Similarly, the fiber diameter of the membrane in FIG. 7F is greater than that in FIG. 7E, which is greater than that in FIG. 7D. Membranes having a greater fiber diameter can bear more water pressure, thus providing better water resistance. For example, a membrane having a fiber diameter of 100-400 nm can bear water pressure of about 1-2 mH$_2$O; a membrane having a fiber diameter of 400-700 nm can bear water pressure of about 2-2.5 mH$_2$O; and a membrane having a fiber diameter of 800-1000 nm can bear water pressure of more than 4 mH$_2$O.

Figure 8A:
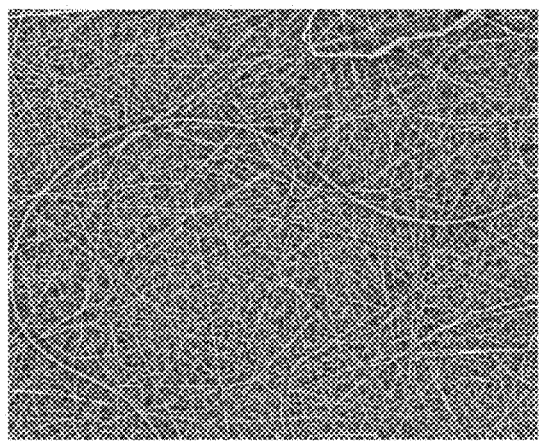
FIGS. 8A and 8B are SEM photographs showing membranes before and after a thermal pressing process, respectively, according to example embodiments.
Figure 8B:
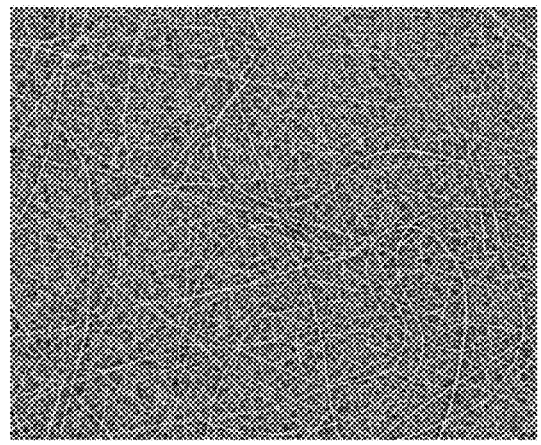

FIGS. 8A and 8B are SEM photographs showing membranes before and after a thermal pressing process, respectively, according to example embodiments. The membrane (FIG. 8A) can be fluffy without the thermal press. After undergone a thermal press at an elevated temperature of about 110° C., the membrane (FIG. 8B) becomes dense and smooth. The temperature is selected such that the fibers would not be melt. For example, the temperature for the thermal pressing may be 80° C.-200° C., 100° C.-170° C., 100° C.-150° C., 100° C.-140° C., 100° C.-130° C., 100° C.-120° C., 150° C.-160° C., or 160° C.-170° C. The thermal pressing also improves the reliability of membranes, making them less susceptible to delamination. The thermal pressing process has limited impact on the breathability of the film or membrane. For example, an air flow/transmission rate of a membrane at 70 mbar is 25.4 l/min/cm$^2$ before the thermal pressing and 23.4 l/min/cm$^2$ before the thermal pressing. In another embodiment, an air flow/transmission rate of a membrane at 70 mbar is 30.2 l/min/cm$^2$ before the thermal pressing and 23.4 l/min/cm$^2$ before the thermal pressing. In some embodiments, hydrostatic pressure of the breathable film before and after thermal pressing are about 26 kPa while a conventional film is lower than 10 kPa.

The breathable films formed with the techniques disclosed herein may be subject to IPX8 or IPX7 (ingress protection) tests. In some embodiments, a breathable film comprises a nonwoven substrate and a PVDF membrane (0.03 mm in thickness) formed with the electrospinning techniques. The breathable film has an air transmission rate at about 9890 ml/min/cm$^2$. The breathable film may withstand the test for 1-1.5 hours with no water visible in the enclosure of the sample. The air permeability test under the GB/T 5453-1997 standard for the breathable film is found to be 1.1714-1.3346×10$^8$ ml/min/m$^2$ (milliliter per minute per meter). The breathable film also satisfies UL 94-V-0 F2 flammability test and the IEC 60068 environmental test between −40° C.-125° C. The breathable film can withstand humidity test at 85° C., 85% relative humidity (RH) for 1000 hours and corrosive gases such as NO$_x$, SO$_x$, H$_2$S, Cl$_x$, etc.

In some embodiments, depending on the required waterproof capacity, a breathable film may be formed with a selected substrate or without a substrate. In one instance, a PVDF breathable film without a substrate (similar to the breathable film 200 in FIG. 2A) may achieve a water resistance of 1-2 mH$_2$O for 2 hours. In another instance, a PVDF breathable film with a nonwoven substrate may achieve a water resistance of 3-4 mH$_2$O for 2 hours. In another instance, a PVDF breathable film with a mesh substrate (80 pores/in$^2$) may achieve a water resistance of 4-5 mH$_2$O for 2 hours. In yet another instance, a PVDF breathable film with a mesh substrate (60 pores/in$^2$) may achieve a water resistance of 6-7 mH$_2$O for 2 hours. The PVDF breathable films are formed with fibers of 500-1000 nm.

In some embodiments, post annealing may be applied to the breathable films to improve their waterproof capacity.

For example, a PVDF breathable film with a mesh substrate (4000 pores/in$^2$) may achieve a water resistance of 2-3 mH$_2$O for 2 hours. After the breathable film is annealed at 150-160° C., it exhibits an improved water resistance of 4-5 mH$_2$O for 2 hours. In another instance, after the breathable film is annealed at 160-170° C., it exhibits an improved water resistance of 6-8 mH$_2$O for 2 hours.

As compared with the conventional breathable films, the breathable films formed with the techniques disclosed herein may obtain better air flow and waterproof capacity due to, in part, the fibrous membranes formed with electrospinning techniques and particularly selected materials for the substrate, adhesive, and membrane. Further, the diameters of the fibers for the membrane can be varied to provide optimized air-permeable and waterproof characteristics.

EXAMPLES

The following examples are included to demonstrate specific embodiments of the disclosure. It should be appreciated by those of skill in the art that the techniques disclosed in the examples which follow represent techniques to function well in the practice of the disclosure, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the disclosure.

Example 1. Comparison of Polymers

This example tested four commonly used polymers in preparing thin films using the electrospinning process, and showed that thin films prepared with PVDF exhibited the best performance in water resistance.

Four different polymer materials, including PVDF, polystyrene (PS), polyacrylonitrile (PAN), and Nylon, were used to prepare thin membranes. Table 1 below summarizes molecule weight of the materials, their concentrations, and the conditions for the electrospinning process.

Results of testing of the water resistance for each product are also presented in Table 1. As shown, under similar conditions, the air-permeable membrane made of PVDF was more effective in the waterproof function than PS, PAN or nylon.

| Polymer | Molecular weight | Concentration | Feeding rate | Voltage | Water entry Pressure (mH$_2$O) |
|---|---|---|---|---|---|
| PVDF | N/A | 18 | 1.5 | 25 | 3 |
| PS | 80,000 | 6 | 1.5 | 25 | 0.5 |
| PAN | 150,000 | 10 | 1.5 | 25 | 0 |
| Nylon | N/A | 15 | 1.0 | 25 | 0 |

Example 2. Assessment of Air-Permeable Waterproof Membranes

This example compared membranes preparing by electrospinning PVDF to those prepared by the conventional expanded polytetrafluoroethylene (e-PTFE) technology.

A conventional breathable film uses expanded polytetrafluoroethylene (e-PTFE) as a membrane (0.03 mm in thickness) attached to a PET (polyethylene terephthalate) substrate with an acrylic adhesive. Such a conventional breathable film, according to public literature, achieves an air transmission rate at about 3300 ml/min/cm$^2$ under air pressure of 70 mbar with a water resistance of 1-2 mH$_2$O.

Another conventional breathable film uses e-PTFE as a membrane (0.03 mm in thickness) attached to a PET substrate with a silicone adhesive. According to public literature, such a conventional breathable film achieves an air transmission rate equal to or less than 1150 ml/min/cm$^2$ under air pressure of 70 mbar with a water resistance of 1-2 mH$_2$O.

A breathable film was prepared using the present electrospinning technology with PVDF, as described in Example 1. The new breathable film, at a thickness of about 0.03 mm, achieved an air transmission rate of about 9890 ml/min/cm$^2$ under air pressure of 70 mbar, and a water resistance of greater than 4 mH$_2$O.

The breathable film formed with the techniques disclosed herein may be used to provide waterproof functions to electronic devices such as watches, mobile phones, exterior lighting, electric shavers, electric toothbrushes, sensors, solar equipment, medical devices, etc.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A breathable film, comprising:
   a substrate;
   a membrane disposed on the substrate, the membrane comprising a plurality of fibers including one or more of polyvinylidene having carbon atoms partially fluorinated, polyvinylidene fluoride, polypropylene, polyethylene, poly(ethylene oxide), polyethylene terephthalate, nylon, polyvinyl alcohol, polyvinylpyrrolidone, polystyrene, polyacrylonitrile, polyimide, polyvinyl chloride, polycarbonate, polyurethane, polysulfone, polyactic acid, polytetrafluoroethylene, polybenzoxazoles, poly-aramid, poly(phenylene sulfide), or polyphenylene terephthalamide;
   an adhesive interposed between the substrate and the membrane, and covering a first surface of the membrane; and
   an adhesive layer covering a second surface of the membrane, wherein the second surface is opposite to the first surface, and an area of the first surface is greater than an area of the second surface,
   wherein the breathable film has an air transmission rate equal to or greater than 4000 ml/min/cm$^2$ under air pressure of 70 mbar.

2. The breathable film of claim 1, wherein the breathable film has an air transmission rate equal to or greater than 5000 ml/min/cm$^2$ under air pressure of 70 mbar.

3. The breathable film of claim 1, wherein the breathable film has an air transmission rate equal to or greater than 7000 ml/min/cm$^2$ under air pressure of 70 mbar.

4. The breathable film of claim 1, wherein the breathable film has a water resistance greater than 1 mH$_2$O.

5. The breathable film of claim 1, wherein the substrate includes one or more of nylon, polyethylene terephthalate, or polypropylene.

6. The breathable film of claim 1, wherein the substrate includes a non-woven thin film or a mesh film.

7. The breathable film of claim 1, wherein the membrane has a thickness of 10-300 μm.

8. The breathable film of claim 1, wherein the membrane is prepared by an electrospinning method.

9. The breathable film of claim 1, wherein the fibers have a diameter of 100-3000 nm.

10. The breathable film of claim 1, wherein the substrate has a pore density of 1000-10000 pores/in$^2$.

11. The breathable film of claim 10, wherein the substrate has a pore density of 4000-7000 pores/in$^2$.

12. The breathable film of claim 1, wherein the membrane has an air transmission rate equal to or greater than 5000 l/min/cm$^2$ under air pressure of 70 mbar.

13. The breathable film of claim 1, wherein the membrane has an air transmission rate equal to or greater than 7000 l/min/cm$^2$ under air pressure of 70 mbar.

14. A method for forming a breathable film, comprising:
providing a substrate;
coating an adhesive on the substrate;
electrospinning a membrane on the adhesive layer; and
thermal pressing the breathable film at a temperature of 80-200° C.

15. The method of claim 14, further comprising: forming an adhesive layer on a portion of the membrane.

16. The method of claim 14, wherein the breathable film has an air transmission rate equal to or greater than 4000 ml/min/cm$^2$ under air pressure of 70 mbar.

17. The method of claim 14, wherein the breathable film has an air transmission rate equal to or greater than 5000 ml/min/cm$^2$ under air pressure of 70 mbar.

18. The method of claim 14, wherein the breathable film has an air transmission rate equal to or greater than 7000 ml/min/cm$^2$ under air pressure of 70 mbar.

19. The method of claim 14, wherein the membrane comprises a plurality of fibers including one or more of polyvinylidene having carbon atoms partially fluorinated, polyvinylidene fluoride, polypropylene, polyethylene, poly(ethylene oxide), polyethylene terephthalate, nylon, polyvinyl alcohol, polyvinylpyrrolidone, polystyrene, polyacrylonitrile, polyimide, polyvinyl chloride, polycarbonate, polyurethane, polysulfone, polyactic acid, polytetrafluoroethylene, polybenzoxazoles, poly-aramid, poly(phenylene sulfide), or poly-phenylene terephthalamide.

20. A breathable film, comprising:
a membrane comprising a plurality of fibers including one or more of polyvinylidene having carbon atoms partially fluorinated, polyvinylidene fluoride, polypropylene, polyethylene, poly(ethylene oxide), polyethylene terephthalate, nylon, polyvinyl alcohol, polyvinylpyrrolidone, polystyrene, polyacrylonitrile, polyimide, polyvinyl chloride, polycarbonate, polyurethane, polysulfone, polyactic acid, polytetrafluoroethylene, polybenzoxazoles, poly-aramid, poly(phenylene sulfide), or poly-phenylene terephthalamide;
an adhesive covering a first surface of the membrane; and
an adhesive layer covering a second surface of the membrane, wherein the second surface is opposite to the first surface, and an area of the first surface is greater than an area of the second surface,
wherein the breathable film has an air transmission rate equal to or greater than 4000 ml/min/cm$^2$ under air pressure of 70 mbar.

* * * * *